(12) United States Patent
Karabinis (10) Patent No.: US 8,045,975 B2
(45) Date of Patent: Oct. 25, 2011

(54) SYSTEMS AND METHODS FOR INTER-SYSTEM SHARING OF SATELLITE COMMUNICATIONS FREQUENCIES WITHIN A COMMON FOOTPRINT

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 119 days.

(21) Appl. No.: 12/495,181

(22) Filed: Jun. 30, 2009

(65) Prior Publication Data

US 2009/0270089 A1  Oct. 29, 2009

Related U.S. Application Data

(60) Division of application No. 11/457,605, filed on Jul. 14, 2006, which is a continuation of application No. 10/932,810, filed on Sep. 2, 2004, now Pat. No. 7,113,743.

(60) Provisional application No. 60/502,787, filed on Sep. 11, 2003.

(51) Int. Cl.
  *H04Q 7/20* (2006.01)
(52) U.S. Cl. ....... 455/427; 455/12.1; 455/13.3; 342/352
(58) Field of Classification Search ................ None
  See application file for complete search history.

(56) References Cited

U.S. PATENT DOCUMENTS

| | | |
|---|---|---|
| 4,689,625 A | 8/1987 | Barmat |
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |

(Continued)

FOREIGN PATENT DOCUMENTS

EP  0 506 255 A2  9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Phuoc Doan
(74) *Attorney, Agent, or Firm* — Myers Bigel Sibley & Sajovec, P.A.

(57) ABSTRACT

Two satellite communications systems can use the same frequency or frequencies in geographically overlapping footprints, without creating undue interference in a given system that is caused by the same frequency signal(s) that is/are used by the other system. In particular, an aggregate Effective Isotropic Radiated Power (EIRP) of the radioterminals and/or ancillary terrestrial components of a second satellite communications system in the common footprint is sufficiently low, and/or the receive antenna gain of a first satellite communications system is sufficiently low compared to the receive antenna gain of the second satellite communications system, so as to increase an aggregate receiver noise that is seen by the first satellite system receivers by an amount that does not substantially change a Quality of Service (QoS) of the first satellite communications system.

8 Claims, 2 Drawing Sheets

U.S. PATENT DOCUMENTS

| | | |
|---|---|---|
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,781,540 A * | 7/1998 | Malcolm et al. ............... 370/321 |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,336,030 B2 | 1/2002 | Houston et al. |
| 6,339,707 B1 * | 1/2002 | Wainfan et al. ............... 455/427 |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,714,760 B2 | 3/2004 | Robinett |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,950,625 B2 | 9/2005 | Regulinski et al. |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,068,975 B2 | 6/2006 | Loner |
| 7,092,708 B2 | 8/2006 | Karabinis |
| 7,113,743 B2 | 9/2006 | Karabinis |
| 7,113,778 B2 | 9/2006 | Karabinis |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,453,920 B2 | 11/2008 | Churan |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,577,400 B2 | 8/2009 | Karabinis et al. |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,603,081 B2 | 10/2009 | Karabinis |
| 7,603,117 B2 | 10/2009 | Karabinis |
| 7,606,590 B2 | 10/2009 | Karabinis |
| 2001/0018327 A1 | 8/2001 | Houston et al. |
| 2002/0058477 A1 | 5/2002 | Chapelle |
| 2002/0122408 A1 | 9/2002 | Mullins |
| 2003/0003815 A1 | 1/2003 | Yamada |
| 2003/0050008 A1 | 3/2003 | Patterson et al. |
| 2003/0149986 A1 | 8/2003 | Mayfield et al. |
| 2004/0029549 A1 | 2/2004 | Fikart |
| 2004/0072539 A1 | 4/2004 | Monte et al. |
| 2004/0203393 A1 | 10/2004 | Chen |
| 2004/0240525 A1 | 12/2004 | Karabinis et al. |
| 2005/0041619 A1 | 2/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0181786 A1 | 8/2005 | Karabinis et al. |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0288011 A1 | 12/2005 | Dutta |
| 2006/0040613 A1 | 2/2006 | Karabinis et al. |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0037514 A1 | 2/2007 | Karabinis |

| | | |
|---|---|---|
| 2007/0072545 A1 | 3/2007 | Karabinis et al. |
| 2007/0072603 A1* | 3/2007 | Wang .................... 455/427 |
| 2007/0087690 A1 | 4/2007 | Karabinis |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0149127 A1 | 6/2007 | Karabinis |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0032690 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0040100 A1 | 2/2009 | Levin et al. |
| 2009/0042509 A1 | 2/2009 | Karabinis et al. |
| 2009/0042516 A1 | 2/2009 | Karabinis |
| 2009/0075645 A1 | 3/2009 | Karabinis |
| 2009/0088151 A1 | 4/2009 | Karabinis |
| 2009/0104903 A1 | 4/2009 | Karabinis |
| 2009/0131046 A1 | 5/2009 | Karabinis et al. |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |

OTHER PUBLICATIONS

Ayyagari et al., "A satellite-augmented cellular network concept", *Wireless Networks*, Vo. 4, 1998, pp. 189-198.

Communication with Supplementary European Search Report, Jul. 21, 2011.

\* cited by examiner

SYSTEMS AND METHODS FOR INTER-SYSTEM SHARING OF SATELLITE COMMUNICATIONS FREQUENCIES WITHIN A COMMON FOOTPRINT

CROSS-REFERENCE TO RELATED APPLICATIONS

This application is a divisional of application Ser. No. 11/457,605, filed Jul. 14, 2006, entitled Systems and Methods for Inter-System Sharing of Satellite Communications Frequencies Within a Common Footprint, which itself is a continuation of application Ser. No. 10/932,810, filed Sep. 2, 2004 now U.S. Pat. No. 7,113,743, entitled Systems and Methods for Inter-System Sharing of Satellite Communications Frequencies, which itself claims the benefit of provisional Application No. 60/502,787, filed Sep. 11, 2003, entitled Systems and Methods for Inter-System Sharing of Satellite Communications Frequencies Within a Common Footprint, the disclosures of all of which are hereby incorporated herein by reference in their entirety as if set forth fully herein.

FIELD OF THE INVENTION

This invention relates to radioterminal communications systems and methods, and more particularly to terrestrial and satellite radioterminal communications systems and methods.

BACKGROUND OF THE INVENTION

Satellite radioterminal communications systems and methods are widely used for radioterminal communications. Satellite radioterminal communications systems and methods generally employ at least one space-based component, such as one or more satellites, that is/are configured to wirelessly communicate with a plurality of satellite radioterminals.

A satellite radioterminal communications system or method may utilize a single antenna beam covering an entire area served by the system. Alternatively, in cellular satellite radioterminal communications systems and methods, multiple beams are provided, each of which can serve distinct geographical areas in the overall service region, to collectively serve an overall satellite footprint. Thus, a cellular architecture similar to that used in conventional terrestrial cellular radioterminal systems and methods can be implemented in cellular satellite-based systems and methods. The satellite typically communicates with radioterminals over a bidirectional communications pathway, with radioterminal communication signals being communicated from the satellite to the radioterminal over a downlink or forward link, and from the radioterminal to the satellite over an uplink or return link.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "radiotelephone," "terminal" or "wireless user device".

Terrestrial networks can enhance cellular satellite radioterminal system availability, efficiency and/or economic viability by terrestrially reusing at least some of the frequency bands that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into buildings. As a result, the satellite spectrum may be underutilized or unutilized in such areas. The terrestrial reuse of the satellite system frequencies can reduce or eliminate this potential problem.

Moreover, the capacity of the overall system may be increased by the introduction of terrestrial frequency reuse of the satellite system frequencies, since terrestrial frequency reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

U.S. Pat. No. 6,684,057, to Karabinis, entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

United States Patent Application Publication No. 2003/0054761 A1, published Mar. 20, 2003 to Karabinis, entitled Spatial Guardbands for Terrestrial Reuse of Satellite Frequencies, the disclosure of which is hereby incorporated herein by reference in its entirety as if set forth fully herein, describes satellite radiotelephone systems that include a space-based component that is configured to provide wireless radiotelephone communications in a satellite footprint over a satellite radiotelephone frequency band. The satellite footprint is divided into a plurality of satellite cells, in which satellite radiotelephone frequencies of the satellite radiotelephone frequency band are spatially reused. An ancillary terrestrial network is configured to terrestrially reuse at least one of the satellite radiotelephone frequencies that is used in a satellite cell in the satellite footprint, outside the cell and in some embodiments separated therefrom by a spatial guardband. The spatial guardband may be sufficiently large to reduce or prevent interference between the at least one of the satellite radiotelephone frequencies that is used in the satellite cell in the satellite footprint, and the at least one of the satellite radiotelephone frequencies that is terrestrially reused outside the satellite cell and separated therefrom by the spatial guardband. The spatial guardband may be about half a radius of a satellite cell in width.

Satellite radioterminal communications systems and methods that may employ terrestrial reuse of satellite frequencies are also described in Published U.S. Patent Application Nos. US 2003/0054760 to Karabinis, entitled Systems and Methods for Terrestrial Reuse of Cellular Satellite Frequency Spectrum; US 2003/0054814 to Karabinis et al., entitled Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0143949 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, the disclosures of all of which are hereby incorporated herein by reference in their entirety as if set forth fully herein.

As satellite radioterminal communications systems and methods become more widely used, the satellite radioterminal spectrum may become more crowded. As is well known to those having skill in the art, the downlink L-band satellite radioterminal spectrum ranges from 1525-1559 MHz, and the uplink L-band satellite spectrum ranges from 1626.5-1660.5 MHz. Inter- and intra-government relationships have allocated this frequency spectrum among multiple satellite radioterminal communications systems, including that of Inmarsat, Mobile Satellite Ventures (MSV), Mexico, Russia, Search and Rescue (SAR) and Radio-At-Sea (RAS). In allocating this spectrum, it is known to allow two satellite communications systems to share a common frequency when they cover geographically spaced-apart footprints (inter-satellite footprint sharing of frequencies).

It may be desirable for a satellite communications system to include multiple large, continuous bands of spectrum, for example up to 5 MHz or more continuous bands of spectrum, so as to allow, for example, wideband technologies, such as Wideband CDMA (WCDMA), to be used. Unfortunately, the present spectrum allocations to each of the L-band systems cited above include many small frequency band slices, and may not include any, or may only include a small number of, frequency bands that are 5 MHz or more wide.

SUMMARY OF THE INVENTION

Some embodiments of the present invention allow two satellite radioterminal communications systems to use the same frequency or frequencies in geographically overlapping footprints, without creating undue interference in a given system (inter-system interference), that is caused by the same frequency signal(s) that is/are used by the other system. In some embodiments, a first satellite radioterminal communications system provides satellite radiotelephone communications to a first set of radioterminals over a first satellite radioterminal frequency band in a first footprint, such as may be provided by a global beam and/or spot beams. A second satellite radioterminal communications system provides radioterminal communications to a second set of radioterminals that may also be responsive to ancillary terrestrial components, over at least some frequencies of the first satellite radioterminal frequency band, in a second footprint that overlaps with the first footprint. The aggregate Effective Isotropic Radiated Power (EIRP) of the second set of radioterminals and/or ancillary terrestrial components is sufficiently low, and/or the receive antenna gain of the first satellite radioterminal communications system is sufficiently low compared to the receive antenna gain of the second satellite radioterminal communications system, so as to increase the aggregate receiver noise that is seen by the first satellite system receivers by an amount that need not unduly impact the first satellite radioterminal communications system, i.e., does not substantially change (including no change) the Quality of Service (QoS) of the first satellite radioterminal communications system.

It has been found, according to some embodiments of the present invention, that the first satellite receive antenna gain may be sufficiently low relative to the second satellite receive antenna gain, and the aggregate EIRP of the radioterminals and/or ancillary terrestrial components may be sufficiently low, so as to increase the aggregate noise that is seen by the first satellite receive antenna by an amount that need not unduly impact QoS of the first satellite radioterminal communications system. Accordingly, one or more satellite radioterminal communications frequencies may be shared by a plurality of satellite radioterminal communications systems over a geographically overlapping footprint without the need to unduly impact performance of either system. By allowing sharing of satellite radioterminal communications frequencies, relatively large continuous frequency bands may be assembled for the first and/or second satellite radiotelephone communications systems to allow, for example, WCDMA technology, or any other broadband technology, to be used.

DETAILED DESCRIPTION

Specific exemplary embodiments of the invention now will be described with reference to the accompanying drawings.

This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

Figure 1:
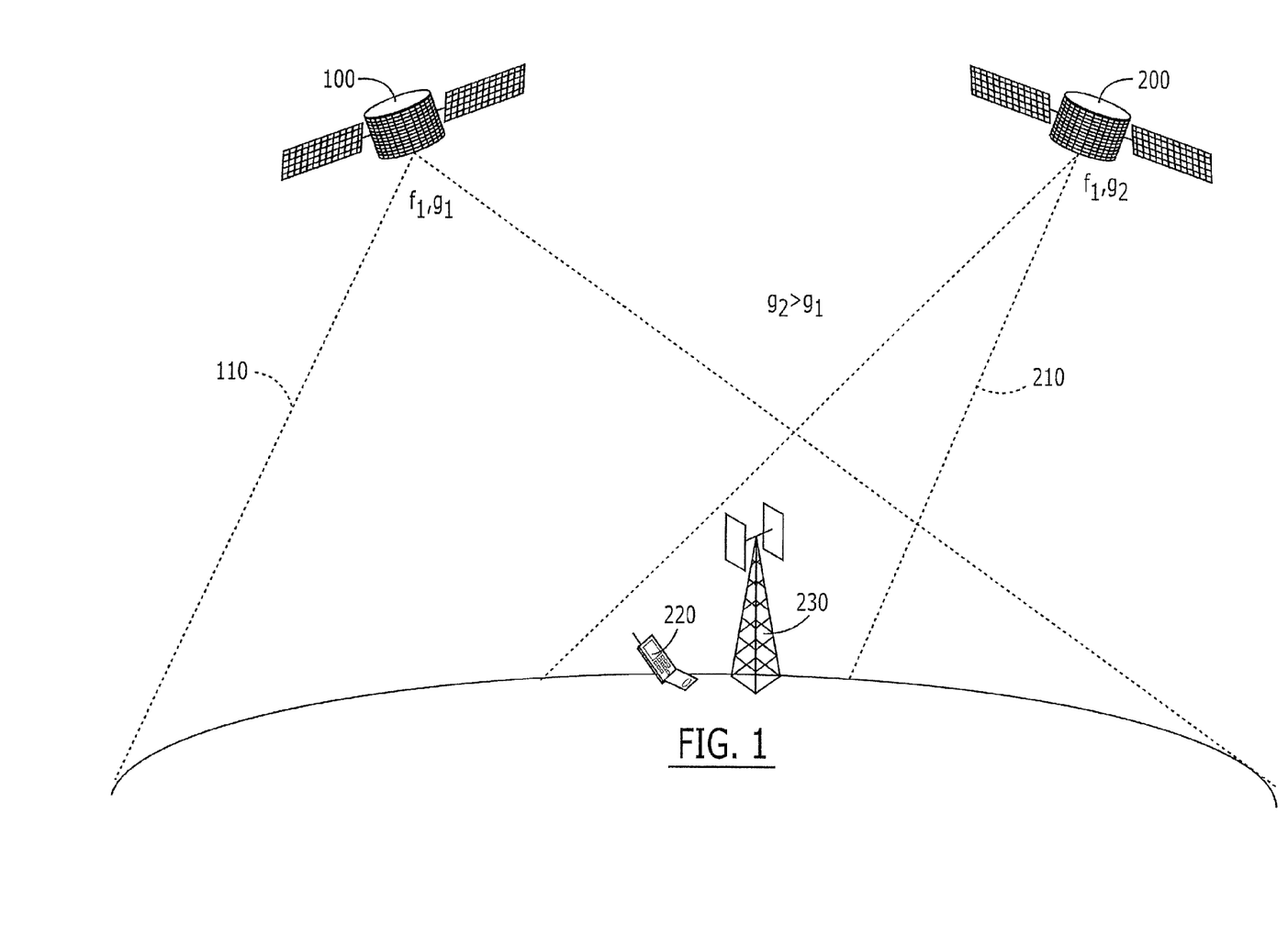
FIGS. 1 and 2 are schematic diagrams of satellite radioterminal systems and methods according to embodiments of the present invention.

FIG. 1 illustrates first and second satellite radioterminal communications systems that are configured for satellite radioterminal communications frequency sharing within a common footprint according to some embodiments of the present invention. Referring now to FIG. 1, a first satellite radioterminal communications system includes a first satellite 100 that communicates over a first satellite radioterminal frequency band $f_1$ (that may include one or more contiguous and/or discontiguous satellite radioterminal communications frequencies) over a first footprint 110 that may include a global beam and/or spot beams (not shown). It will be understood that the first satellite radioterminal communications system may include multiple first satellites 100, which are not shown for simplicity. The first satellite radioterminal communications system may be embodied, for example, in the well known Inmarsat satellite radioterminal communications system.

Still referring to FIG. 1, a second satellite radioterminal communications system includes a second satellite 200 that provides satellite radioterminal communications with radioterminals 220 that may also be responsive and operative with Ancillary Terrestrial Components (ATCs) 230 over the first satellite radioterminal frequency band $f_1$ in a second footprint 210, such as a spot beam footprint, that at least partially overlaps the first footprint 110, using a second satellite receive antenna gain $g_2$ that is higher than a first satellite receive antenna gain $g_1$ of the first satellite radioterminal system. In some embodiments, at least about 20 dB gain difference is present. It will be understood that the second satellite radioterminal system may include more than one second satellite 200, and more than one spot beam, and may communicate with large numbers of radioterminals 220 and/or ancillary terrestrial components 230. Moreover, as used herein, the footprint 110 may be any footprint that is larger than the second footprint 210 and, in some embodiments, may span up to a hemisphere of the globe. The second satellite radioterminal communications system may be embodied, for example, in a satellite radioterminal communications system that is provided by Mobile Satellite Ventures (MSV), the assignee of the present invention, that is described, for example, in any or all the above-cited U.S. Pat. No. 6,684,057 and U.S. patent application Publications.

Still referring to FIG. 1, the gain $g_1$ of the receive antenna of the first satellite 100 may be sufficiently small relative to the gain $g_2$ of the receive antenna of the second satellite 200, such that relatively low EIRP may be radiated by the radioterminals 220 and/or ATCs 230 of the second satellite system. It has been found, according to some embodiments of the present invention, that the relatively low EIRP of the radioterminals 220 and/or ATCs 230, and the relatively low gain $g_1$ of the receive antenna of the first satellite 100 can allow the same frequency band $f_1$ to be used in a geographically overlapping area, such as the area of the second footprint 210, without unduly increasing an equivalent noise that is seen by the receive antenna of the first satellite 100, i.e., without substantially changing (or changing at all) the QoS of the first satellite radioterminal system. Accordingly, the low sensitivity of the global beam and/or spot beam(s) of the first satellite 100 relative to the power level transmitted by the radioterminals 220 and/or ATCs 230 can reduce the interference that is seen by the first satellite radioterminal system to an acceptable level.

It will be understood by those having skill in the art that the above discussion has primarily focused on reducing the uplink interference, from the radioterminals 220 and/or ATCs 230, to the satellite 100. The uplink interference from the radioterminals of the first satellite system to the satellite receivers of the second satellite system also may be reduced, for example, by using interference-reducing systems or methods, such as are described in Provisional Patent Application Ser. No. 60/490,993, entitled Intra- and/or Inter-System Interference Reducing Systems and Methods for Satellite Communications Systems to the present inventor Karabinis et al., filed Jul. 30, 2003, and U.S. patent application Ser. No. 10/890,758 to Karabinis et al., entitled Intra- and/or Inter-System Interference Reducing Systems and Methods for Satellite Communications Systems, filed Jul. 14, 2004, the disclosures of which are hereby incorporated herein by reference in their entirety as if set forth fully herein. Other interference-reducing techniques also may be used. Moreover, in the downlink, interference also may be reduced based on the inherent discrimination of the spot beams and/or on the inherent discrimination that may be provided by the spatial separation between the first and second satellites 100 and 200.

As a specific example, Table 1 provides an analysis of the impact of a spot beam of the second satellite system on an uplink of a global beam of the first satellite system. In the example of Table 1, the first satellite system is the Inmarsat satellite system and the second satellite system is the MSV satellite system.

TABLE 1

| PARAMETER | UNITS | VALUE |
|---|---|---|
| Illustrative MSV Terminal EIRP | dBW | −13 |
| MSV Carrier Bandwidth (illustrative of W-CDMA) | MHz | 5 |
| MSV Terminal EIRP Density | dBW/Hz | −80 |
| Illustrative Number of users (Codes) per carrier ((128) | dB | 21.1 |
| Illustrative System-Wide Carrier Reuse (64-fold); MSV System | dB | 18.1 |
| Illustrative Average EIRP Reduction due to Power Control | dB | 2 |
| Illustrative Average EIRP Reduction due to Voice Activity | dB | 3 |
| Illustrative Linear to RHCP Discrimination | dB | 1.4 |
| Approximate Free-Space Propagation Loss | dB | 188.5 |
| Illustrative Global Beam Gain | dBi | 21 |
| Aggregate EIRP Density at Global Beam Satellite Receiver | dBW/Hz | −214.7 |
| Boltzmann's Constant | dBW/Hz · °K | −228.6 |
| Illustrative Global Beam Noise Temperature | °K | 700 |
| Global Beam Noise Density | dBW/Hz | −200.15 |
| Aggregate Percent Noise Increase (ΔT/T) | % | 3.5 |

As shown in Table 1, an aggregate percent noise increase of only 3.5% may be produced on a satellite receiver of an Inmarsat global beam due to MSV's system-wide satellite operations of radioterminals 220.

Table 2 provides an analysis on the impact of radioterminals operative with ancillary terrestrial components 230 on a satellite receiver of Inmarsat's global beam. As shown in Table 2, a 3.25% aggregate percent noise increase may be produced.

TABLE 2

| PARAMETER | UNITS | VALUE |
|---|---|---|
| Illustrative MSV Terminal EIRP | dBW | −13 |
| MSV Carrier Bandwidth (illustrative of W-CDMA) | MHz | 5 |
| MSV Terminal EIRP Density | dBW/Hz | −80 |
| Illustrative number of users (Codes) Supported by a single Carrier as the carrier is used and reused ATC-Wide (616,595) | dB | 57.9 |
| Aggregate EIRP Density Emitted ATC-Wide | dBW/Hz | −22.1 |
| Illustrative Average EIRP Reduction due to Power Control | dB | 20 |
| Illustrative Average EIRP Reduction due to Voice Activity | dB | 1 |
| Illustrative Linear to RHCP Discrimination | dB | 1.4 |
| Approximate Free-Space Propagation Loss | dB | 188.5 |
| Illustrative Environmental Blockage (due to urban clutter) | dB | 3 |
| Illustrative Global Beam Gain | dBi | 21 |
| Aggregate EIRP Density at Global Beam Satellite Receiver | dBW/Hz | −215 |
| Boltzmann's Constant | dBW/Hz · °K | −228.6 |
| Global Beam Noise Temperature | °K | 700 |
| Global Beam Noise Density | dBW/Hz | −200.15 |
| Aggregate Percent Noise Increase (ΔT/T) | % | 3.25 |

As seen from the illustrative example analyses presented in Tables 1 and 2, the combined aggregate effect of MSV's satellite and ancillary terrestrial operations on an uplink satellite receiver of a first global beam satellite 100 is:

$$(\Delta T/T)_{TOTAL} = (\Delta T/T)_{SAT} + (\Delta T/T)_{ATC} = 3.5 + 3.25 = 6.75\%.$$

This quantity may be quite acceptable from an operational standpoint, and need not impact or substantially impact QoS.

Figure 2:
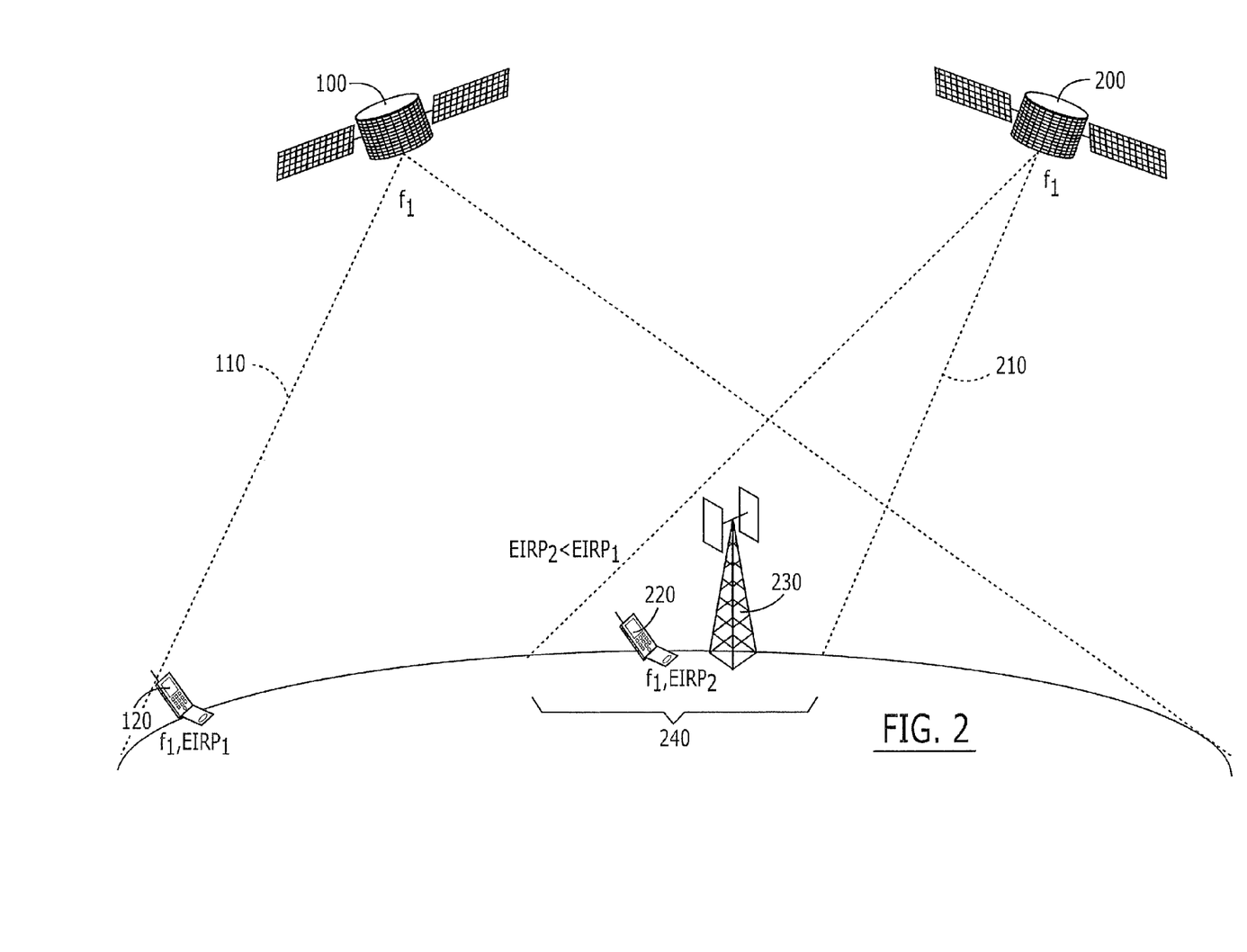

From the downlink standpoint, the Inmarsat satellite beam 110 that may be impacted from spectrum sharing with MSV's (second) satellite system, may be serving maritime users. As such, the second satellite system may be designed so as not to deploy the shared spectrum over any or at least some of its satellite beams 210 that are formed on or close to waterways. In some embodiments, a separation of at least two widths of a spot beam may be maintained between a waterway and the locations where the second satellite system 200 deploys the shared spectrum over its forward satellite spots beams. This can afford significant discrimination (for example, 25 dB of spot beam discrimination) relative to a maritime first satellite system radioterminal that may also be using the shared frequencies. Moreover, the ancillary terrestrial components 230 can reuse the shared forward link spectrum far enough away from waterways so that the aggregate effect of the ATCs on the receiver of a maritime radioterminal of the first system can be negligible (for example, less than 1% aggregate noise increase). An example downlink analysis, where the first system is an Inmarsat system and the second system is an MSV system is provided in Table 3. As shown, a 5% aggregate noise increase is produced. Again, this increase may be quite acceptable from an operational standpoint, and need not impact or substantially impact QoS of the first system.

TABLE 3

| PARAMETER | UNITS | VALUE |
|---|---|---|
| Illustrative MSV Satellite EIRP per User (per Code) | dBW | 45.7 |
| Carrier Bandwidth (illustrative of a W-CDM waveform) | MHz | 5 |
| Illustrative number of users (Codes) per Carrier (32) | dB | 15.1 |
| Carrier EIRP Density | dBW/Hz | −6.2 |

TABLE 3-continued

| PARAMETER | UNITS | VALUE |
|---|---|---|
| Approximate Free-Space Propagation Loss | dB | 188.5 |
| Illustrative MSV Spot Beam Discrimination in Direction of Inmarsat MET (MET 120 relative to spot beam 210) | dB | 25 |
| Illustrative LHCP to RHCP Discrimination | dB | 4 |
| Illustrative Voice Activity | dB | 3 |
| Illustrative Power Control | dB | 2 |
| Illustrative Antenna Gain of Inmarsat MET in Direction of MSV Satellite (gain of MET 120 toward satellite 200) | dBi | 0 |
| Illustrative System-Wide frequency Reuse by MSV (16) | dB | 12.1 |
| Aggregate EIRP Density at Inmarsat MET Receiver | dBW/Hz | −216.6 |
| Boltzmann's Constant | dBW/Hz · °K | −228.6 |
| Illustrative Inmarsat MET Noise Temperature | dB °K | 25 |
| Inmarsat MET Noise Density | dBW/Hz | −203.6 |
| Aggregate Percent Noise Increase ($\Delta T/T$) | % | 5 |

In the illustrative calculations presented above, in Tables 1 through 3, the second satellite system (MSV satellite system) is assumed to be using a Wideband Code Division Multiple Access (W-CDMA) waveform (5 MHz carrier bandwidth) to communicate with radioterminals on its return service links, while using a Wideband Code Division Multiplexed (W-CDM) waveform (also of 5 MHz carrier bandwidth) to communicate with radioterminals on its forward service links. However, any other waveform type with characteristics similar, or substantially similar, to the assumed W-CDMA/W-CDM waveform (in EIRP level, carrier bandwidth, number of codes, and/or frequency reuse, etc.) may have been used without changing, or substantially changing, the conclusions of Tables 1 through 3. The term "MET" as used in Tables 1 through 3, denotes Mobile Earth Terminal and is used synonymously with the term radioterminal or terminal; the term "LHCP" denotes Left Hand Circular Polarization; the term "RHCP" denotes Right Hand Circular Polarization; and, as is identified by row 7 of Table 3, a MET of the first satellite system (Inmarsat system), such as MET 120 (see FIG. 2) is assumed to receive information using a substantially RHCP configured antenna (which is typically the case for Inmarsat METs), and therefore, the first satellite (Inmarsat satellite or satellite 100) is transmitting information on substantially RHCP, while the second satellite (MSV satellite or satellite 200) is transmitting information to MET 220 using substantially LHCP. Thus, a 4 dB LHCP to RHCP discrimination is assumed in the calculation of Table 3 (row 7) reflecting an assumed coupling mismatch between a forward link waveform of the second satellite and an antenna of a MET that is operative with the first satellite system. Furthermore, a MET of the second satellite system (MSV system) is assumed to radiate substantially linearly-polarized electromagnetic energy, and a satellite of the first system is assumed configured to receive substantially RHCP electromagnetic energy. In addition, as used in Tables 1 through 3, the term EIRP denotes Equivalent Isotropic Radiated Power.

FIG. 2 is a schematic diagram of satellite radioterminal systems and methods according to other embodiments of the present invention. As shown in FIG. 2, satellite radioterminal communications frequency sharing systems and methods according to other embodiments of the present invention include a plurality of first radioterminals 120 that communicate with a first satellite radioterminal communications system including a first satellite 100 over a first satellite radioterminal frequency band $f_1$ at a first aggregate effective isotropic radiated power $EIRP_1$. A plurality of second radioterminals 220 communicate with a second satellite radioterminal communications system including a second satellite 200 over the first satellite radioterminal frequency band $f_1$ in a footprint 240 at a second aggregate effective isotropic radiated power $EIRP_2$ that is less than the first aggregate effective isotropic radiated power ($EIRP_2 < EIRP_1$). As was described above in connection with FIG. 1, the second aggregate effective isotropic radiated power can be sufficiently less than the first aggregate effective isotropic radiated power so as to increase aggregate noise that is seen by the first satellite radioterminal communications system by an amount that does not substantially change QoS of the first satellite radioterminal communications system. In some embodiments, this increase may be less than about 3.5%.

In other embodiments, as also shown in FIG. 2, the second radioterminals 220 also communicate terrestrially with at least one ancillary terrestrial component 230 over the first satellite radioterminal frequency band $f_1$ in the footprint 240. In some embodiments of FIG. 2, the second aggregate effective isotropic radiated power and an aggregate effective isotropic radiated power of the at least one ancillary terrestrial component 230 are sufficiently less than the first aggregate effective isotropic radiated power, so as to increase noise that is seen by the first satellite radioterminal communications system, for example by the first satellite 100, by an amount that does not substantially change, and in some embodiments, does not change, QoS of the first satellite radioterminal communications system. In other embodiments, the aggregate noise may increase by less than about 6.75%.

It also will be understood that embodiments of FIGS. 1 and 2 may be combined according to other embodiments of the present invention. Moreover, although embodiments of the present invention have been described above primarily in connection with satellite radioterminal communications frequency sharing systems, analogous radioterminal frequency sharing methods may be provided.

Finally, it also will be understood that the relatively high antenna gain $g_2$ of the second satellite 200 and the relatively high $EIRP_1$ of the first radioterminals 120 may potentially create interference by the first radioterminals 120 to the second satellite radioterminal communications system. This potential interference may be reduced or eliminated using interference canceling techniques that are described in U.S. Pat. No. 6,684,057 and/or the U.S. patent application Publications cited above, and/or using other interference reduction techniques.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A frequency sharing system comprising:
   a first satellite that communicates with first radioterminals in a first service region over a global beam using frequencies of a frequency band; and
   a second satellite that communicates with second radioterminals in a second service region that is contained within the first service region over one or more spot beams using frequencies of the frequency band,
   wherein a gain of the one or more spot beams is at least 20 dB greater than a gain of the global beam.

2. A frequency sharing system according to claim 1 wherein at least some of the first radioterminals communicate with the first satellite by radiating substantially circularly polarized electromagnetic energy and at least some of the second radioterminals communicate with the second satellite by radiating linearly polarized electromagnetic energy.

3. A frequency sharing system comprising:
   a plurality of first radioterminals that communicate with a first satellite over a global beam at a first aggregate effective isotropic radiated power using frequencies of a frequency band in a service region; and
   a plurality of second radioterminals that communicate with a second satellite over one or more spot beams at a second aggregate effective isotropic radiated power that is less than the first aggregate effective isotropic radiated power using frequencies of the frequency band in the service region,
   wherein a gain of the one or more spot beams is at least 20 dB greater than a gain of the global beam.

4. A frequency sharing system according to claim 3 wherein at least some of the plurality of first radioterminals communicate with the first satellite by radiating substantially circularly polarized electromagnetic energy and at least some of the plurality of second radioterminals communicate with the second satellite by radiating linearly polarized electromagnetic energy.

5. A frequency sharing method for a first satellite that communicates with first radioterminals over a global beam using frequencies of a frequency band in a first service region, the method comprising:
   communicating between second radioterminals and a second satellite over one or more spot beams using frequencies of the frequency band in a second service region that is contained within the first service region,
   wherein a gain of the one or more spot beams is at least 20 dB greater than a gain of the global beam.

6. A frequency sharing method according to claim 5 wherein at least some of the first radioterminals communicate with the first satellite by radiating substantially circularly polarized electromagnetic energy and at least some of the second radioterminals communicate with the second satellite by radiating linearly polarized electromagnetic energy.

7. A frequency sharing method for a plurality of first radioterminals that communicate with a first satellite over a global beam using frequencies of a frequency band in a service region at a first aggregate effective isotropic radiated power, the method comprising:
   communicating between a plurality of second radioterminals and a second satellite over one or more spot beams using frequencies of the frequency band in the service region at a second aggregate effective isotropic radiated power that is less than the first aggregate effective isotropic radiated power,
   wherein a gain of the one or more spot beams is at least 20 dB greater than a gain of the global beam.

8. A frequency sharing method according to claim 7 wherein at least some of the first radioterminals communicate with the first satellite by radiating substantially circularly polarized electromagnetic energy and at least some of the second radioterminals communicate with the second satellite by radiating linearly polarized electromagnetic energy.

* * * * *